(12) United States Patent
Rupp

(10) Patent No.: US 11,388,896 B2
(45) Date of Patent: Jul. 19, 2022

(54) GEAR DRIVEN X-Y PLANE OUTRIGGER POSITIONER

(71) Applicant: Rupp Marine, Inc., Port Salerno, FL (US)

(72) Inventor: Scott Rupp, Port Salerno, FL (US)

(73) Assignee: Rupp Marine, inc., Port Salerno, FL (US)

(*) Notice: Subject to any disclaimer, the term of this patent is extended or adjusted under 35 U.S.C. 154(b) by 278 days.

(21) Appl. No.: 16/748,367

(22) Filed: Jan. 21, 2020

(65) Prior Publication Data
US 2020/0229415 A1 Jul. 23, 2020

Related U.S. Application Data

(60) Provisional application No. 62/795,587, filed on Jan. 23, 2019.

(51) Int. Cl.
*A01K 91/08* (2006.01)
*A01K 97/10* (2006.01)

(52) U.S. Cl.
CPC ............ *A01K 91/08* (2013.01); *A01K 97/10* (2013.01)

(58) Field of Classification Search
CPC .................................................... A01K 97/10
USPC .......... 43/43.12, 43.13, 27.4, 21.2; 114/255, 114/364; 248/514, 515
See application file for complete search history.

(56) References Cited

U.S. PATENT DOCUMENTS

| | | | |
|---|---|---|---|
| 3,889,908 A * | 6/1975 | Larson | F16M 11/06 248/515 |
| 1,993,346 A | 2/1991 | Rupp | |
| 5,054,737 A * | 10/1991 | DeLancey | A01K 97/10 248/515 |
| 5,738,035 A | 4/1998 | Rupp, II | |
| 5,855,088 A * | 1/1999 | Lee | A01K 91/08 43/21.2 |
| 5,921,014 A * | 7/1999 | Lee | A01K 91/08 43/21.2 |
| 6,769,377 B2 * | 8/2004 | Rupp, II | B63B 35/14 114/255 |
| 7,114,283 B2 | 10/2006 | Slatter et al. | |
| 7,669,361 B2 | 3/2010 | Baez | |
| 8,186,095 B2 | 5/2012 | Wilcox et al. | |
| 8,468,736 B2 | 6/2013 | Blondek et al. | |
| 9,173,387 B2 | 11/2015 | Rupp | |
| 9,625,087 B2 | 4/2017 | Sarnowski et al. | |
| D817,742 S | 5/2018 | Sarnowski | |
| 2003/0005616 A1* | 1/2003 | Slatter | A01K 91/08 43/27.4 |
| 2004/0206288 A1* | 10/2004 | Wilcox | B63B 17/02 114/255 |
| 2005/0056751 A1* | 3/2005 | Slatter | A01K 91/08 248/288.11 |

(Continued)

*Primary Examiner* — Darren W Ark
(74) *Attorney, Agent, or Firm* — McHale & SLavin, P.A.

(57) ABSTRACT

A gear-train driven outrigger device for use on a fishing vessel having a first tubular member for holding of an outrigger pole. The gear-train driver assembly allows rotation of the outrigger pole in an X or Y plane; the gear-train driver having a selector to chose either an upper gear assembly to allow horizontal rotation of outrigger or a lower gear assembly to allow vertical angular positioning of the outrigger pole, wherein the gear assembly allows for movement of the outrigger pole from a stowage position to an angled trolling position.

10 Claims, 5 Drawing Sheets

(56) References Cited

U.S. PATENT DOCUMENTS

| | | | | |
|---|---|---|---|---|
| 2006/0102822 A1* | 5/2006 | Liang | ............... | G09F 17/00 |
| | | | | 248/514 |
| 2007/0157863 A1* | 7/2007 | Wilcox | ............ | B63B 17/02 |
| | | | | 114/255 |
| 2011/0083355 A1* | 4/2011 | Wilcox | ............ | A01K 91/08 |
| | | | | 43/27.4 |
| 2013/0333271 A1* | 12/2013 | Rupp | ............... | B63B 17/00 |
| | | | | 43/27.4 |
| 2017/0074454 A1* | 3/2017 | Sarnowski | ......... | B63B 17/00 |

\* cited by examiner

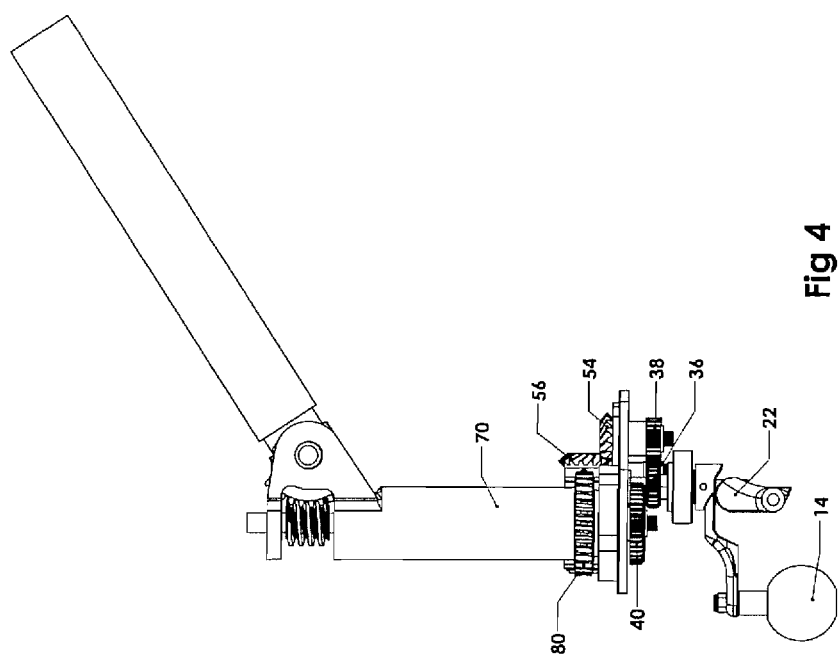
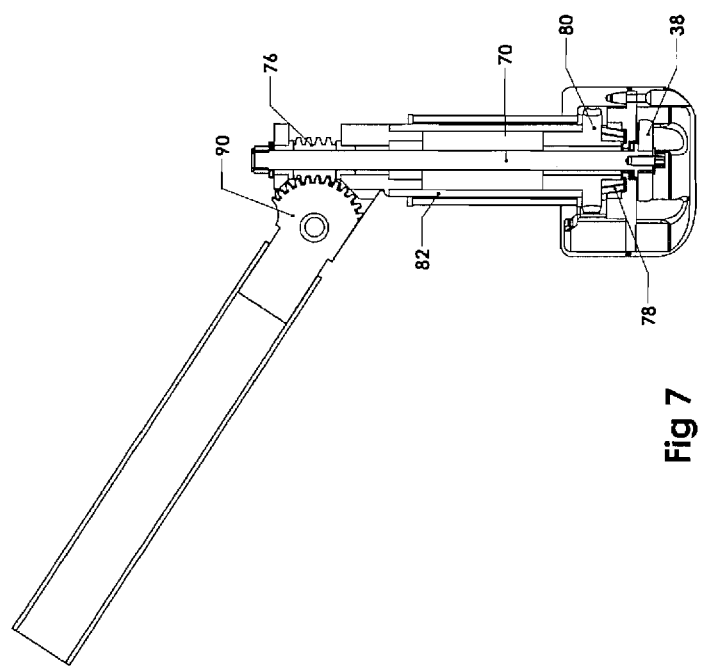

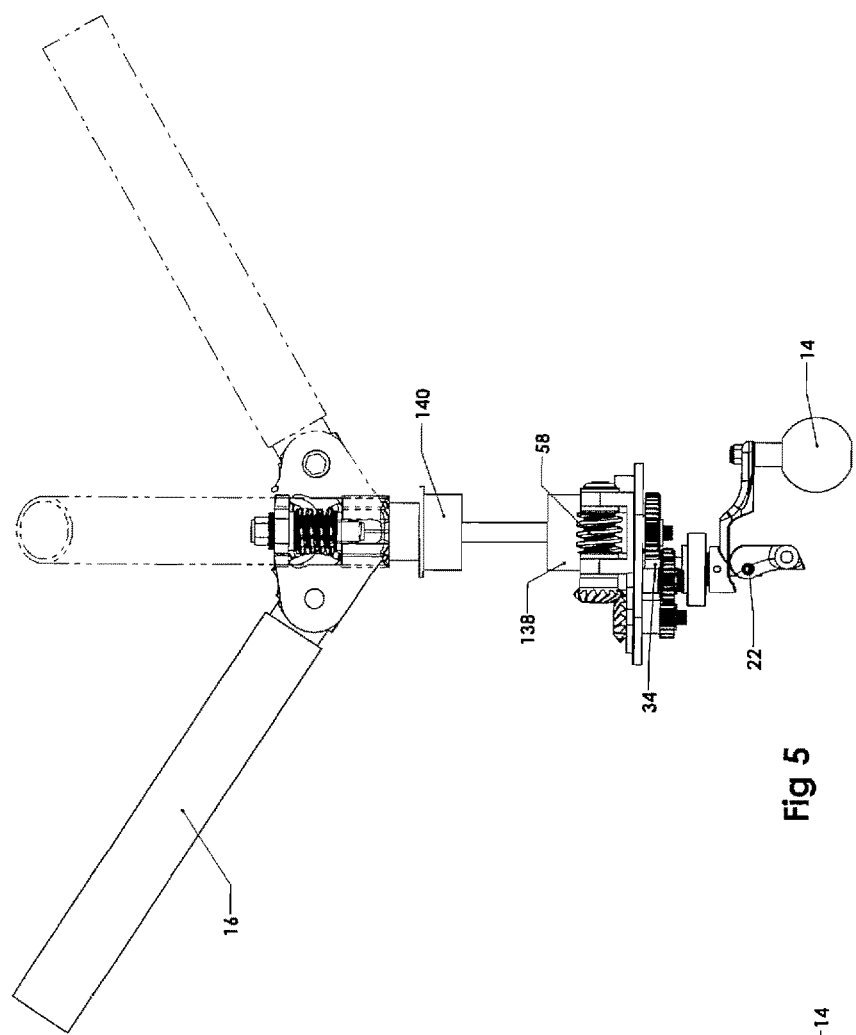
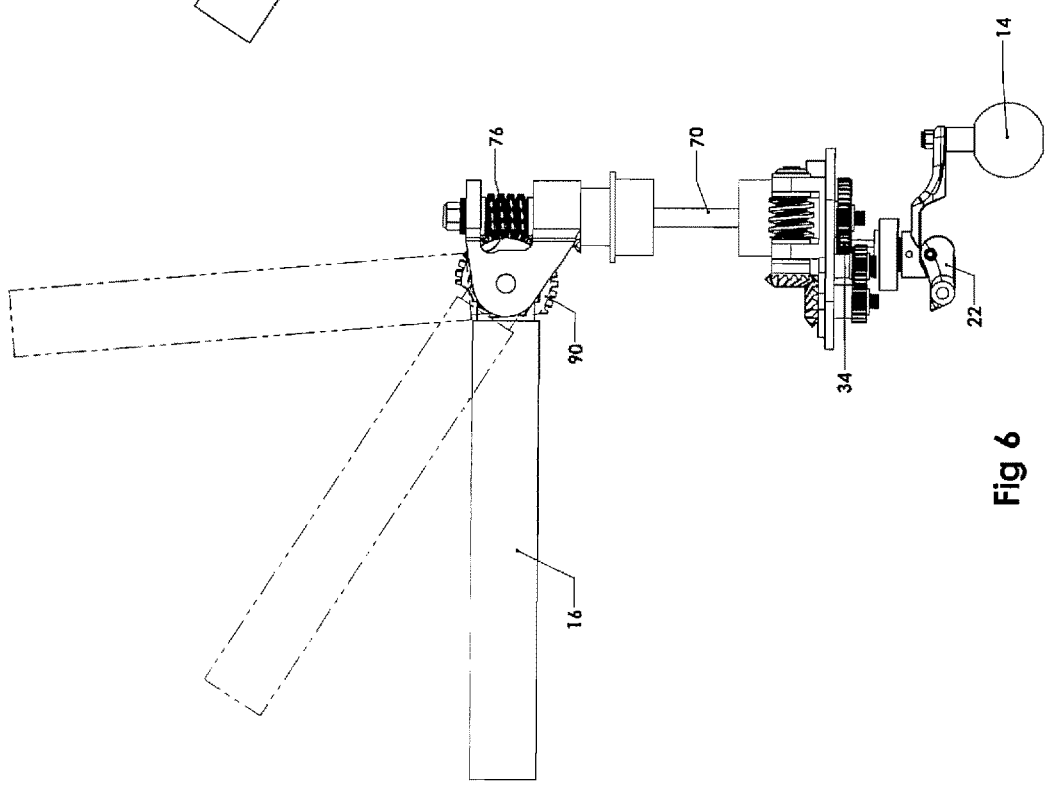

GEAR DRIVEN X-Y PLANE OUTRIGGER POSITIONER

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/795,587 entitled "GEAR DRIVEN X-Y PLANE OUTRIGGER POSITIONER" filed Jan. 23, 2019. The contents of the above referenced application are incorporated herein by reference.

FIELD OF THE INVENTION

This invention relates to the field of fishing, and more particularly, to a gear driven outrigger positioner having movement in both the X and Y plane for use on fishing boats.

BACKGROUND OF THE INVENTION

While numerous methods of saltwater fishing exist, the use of a boat has many advantages for both the professional and recreational fisherman. For this reason, many boat manufacturers have built vessels directed solely to the art of fishing. Open fishing boats, so defined due to the open area around a center console, are of particular interest since they are capable of high speeds, are economical to operate, and provide a very safe platform from which to fish.

While outriggers are a common fixture on large sportfishing vessels, the use of the open fishing vessels have become a viable option to many anglers. Notwithstanding the obvious cost savings in vessel purchase, maintenance, and operating cost, the open fishing vessel can be made extremely fast and are highly maneuverable, making them the preferred vessel for fishing tournaments and recreational fishing.

Mounting of an outrigger system on an open fishing vessel is unlike that of a conventional sport fishing vessel since a benefit of the open fishing vessel is the ability to walk around a centrally located console station. Most open fishing vessels include the use of a T-top that, as the name implies, is formed from a "T" like structure to provide protection from the sun and rain for those standing around the console. The T-top structure is unique, as it does not inhibit operation of the vessel, and allows an occupant to walk around the vessel uninhibited.

U.S. Pat. Nos. 4,993,346 and 5,738,035, incorporated herein by reference, disclose open fishing vessels employing outriggers on T-tops, half towers, or the like. Current boating designs for high speed fishing vessels ideally allow the placement of outriggers in a stowage position, movable to a trolling position, without interfering with the occupant area. The use of a combination control lever and locking mechanism permits placement of the outrigger, by manipulation of the control lever, safely within the confines of the vessel.

Fishing with outriggers is performed when a fishing vessel is driven slowly, commonly referred to as trolling, which permits the strategic placement of bait behind the vessel. Trolling allows the fishing vessel to cover large areas of water so as to increase the chance of catching fish. The quantity and spacing of the bait placed behind the vessel is generally proportional to the size of the vessel, as well as the success of the fishing expedition. If the bait is properly placed, the wake generated by the vessel can be made to appear like a school of bait fish. Bait fish that appear to be struggling or separated from a school of fish are attractive to predator fish.

The positioning of bait behind a vessel would be limited but for the use of the outriggers. Most open fishing vessels have a beam less than ten feet wide. Trolling with more than two fishing lines behind the vessel provides very little distance between the baits, and limits the ability to place bait outside of the boat wake. Further, more than two lines behind a narrow beam vessel severely limit vessel maneuvering. Even a gradual turn may cause bait lines to cross and become entangled. In addition, closely positioned baits can become entangled during a fish strike.

The use of outriggers provides a means for effectively widening the spacing of the bait, as well as adding additional bait/lines without fear of tangling of the lines. An outrigger is basically a long pole having a proximal end coupled to the vessel and a distal end that can be rotated from a stowage position outboard to an outwardly extended trolling position. A positioning line is drawn along the length of the outrigger pole, wherein release clips secured to the positioning line are used to secure a fishing line at a desired location for trolling of bait. When a fish strikes the bait, the release clip disengages the fishing line from the positioning line and the fisherman is free to reel in the fish without interference. Proper placement of the outrigger pole and fishing line increases the chances of fish being drawn to the bait.

For example, by use of two fifteen foot outriggers, a vessel with a ten foot beam may extend the distances between bait, effectively covering a thirty foot spread behind the vessel. However, having outrigger poles extend from each side of a vessel during non-fishing times has obvious drawbacks. For this reason, outriggers must be stowable to allow for normal traveling and docking. The outriggers are typically stored within the vertical plane of the vessel; the vertical plane defined by the side walls of the vessel. In operation, the outrigger is swung laterally outward to a deployed position for fishing purposes. Outrigger poles may extend from ten to thirty feet long; longer poles being cable trussed to prevent excessive flexing.

Mounting outriggers to open fishing vessels presents numerous problems, mainly due to the stability of a narrow beam boat in open water, as well as the operational speeds that the open fishing vessels are capable of. A basic requirement is the safety of the vessel occupants, wherein an operator of the outrigger can be rotated while the occupant remains in the safety of the vessel, preferably while standing next to the console, beneath the T-top. Associated with this safety aspect is the need for a locking mechanism capable of withstanding the large cantilever forces presented by the outrigger arrangement. For instance, a fifteen foot outrigger secured to a T-top has a distal end cantilevered from the base. When the vessel is placed in an ocean environment, it is not uncommon for the vessel to be subjected to large seas, wherein the twisting force of the outrigger pole places an enormous strain on the base of the outrigger. If the outrigger's sole source of outrigger pole positioning is the locking mechanism, the locking mechanism must be able to withstand the entire force presented by the cantilevered configuration.

Most all outrigger systems employ a locking mechanism that, when the locking mechanism is in an unlocked position, allows the outrigger to freely rotate. Thus, a control situation occurs when an outrigger is unlocked while the vessel is being subjected to movement, such as wave displacement. In this situation, the outrigger may move due to the rotational motion provided by the wave motion. Should the wave motion be violent, the rotational motion can be transferred to the outrigger, resulting in a violent movement of the outrigger that the operator will not be able to control.

Rotational movements by wave action can create outrigger movement, even if the locking mechanism is "engaged." This occurs if the locking mechanism is worn, fails, or simply is not capable of securing against the rotational forces caused by a cantilevered outrigger. Longer and/or heavier outriggers further the rotational associated problems exponentially. The result is a dangerous situation for vessel occupants located near or in the path of the outrigger(s). Should the locking mechanism fail in close quarter maneuvering, the outrigger might freely swing out, resulting in damage to any item within the outrigger path. In addition, the conventional outrigger control for open fishing vessels provides a 1:1 ratio, therein the movement of a hand lever results in a corresponding movement of an outrigger. This straight ratio can make it difficult to operate long and/or heavy outrigger poles. Even if an outrigger pole is short, dirt and corrosion may inhibit pole movement.

U.S. Pat. No. 9,625,087 discloses a mount capable of rotating a body in multiple planes with a single handle. The handle can be disposed in a first position, where rotation of the handle causes the body to rotate in a horizontal plane; or a second position, where rotation of the handle causes the body to rotate in a vertical plane. The body can otherwise be locked and not rotatable.

U.S. Pat. No. 7,114,283 discloses an adjustable arm assembly for use with an outrigger that includes a rotating arm tube secured to a lower head, an upper pivoting head operatively engaged to the lower head and an operating barrel, and a crank assembly operatively engaged to the operating barrel and secured to the rotating arm tube. Additionally, the adjustable arm assembly further includes a threaded operating shaft in rotational engagement with the crank assembly, the threaded operating shaft engaging adjustment threads of the operating barrel, and a position indicator tube having a position indicator connected to the operating barrel.

What is needed in the art is an outrigger positioner that provides a simultaneous controlled rotation of an outrigger pole in both a horizontal and vertical position, X-Y plane, by use of a constantly engaged rotation mechanism to prevent uncontrolled movement of the outrigger pole, as well as a means for increasing the torque applied through the outrigger positioning assembly.

SUMMARY OF THE INVENTION

An outrigger positioner assembly that is installed on a T-top equipped fishing vessel. Installation allows an outrigger pole to be supported above the T-top, and permits a full range of rotational movement of the outrigger pole between the stowage position and a trolling position in both an X and Y plane. Rotation can be performed by a person safely standing in the fishing vessel beneath the shelter of the T-top by manipulation of a gear-train assembly that provides positive engagement of the outrigger pole throughout the full range of positioning.

An essential component of the instant invention is the use of a gear-train to provide an increase in torque, allowing hand rotation to effect outrigger pole movement. The outrigger positioner of the instant invention employs a base member which is secured to a fixed structure, such as the T-top, having the gear-train driven positioner mounted beneath the T-top structure. The gear-train driven assembly of the present invention preferably utilizes a worm gear and drive gear, which effectuates a transfer of rotational torque from the hand crank or a motor driven crank to cause a torque increased rotation movement of the outrigger pole in both an X and Y plane. In this manner, positive movement of the outrigger pole from a stowage position over the fishing vessel to a raised and extended trolling position is performed with fully engaged gears so that movement is controlled at all times. The use of the torque multiplier gear-train allows movement of oversized outriggers, even if the outrigger assembly has been poorly maintained, resulting in friction inhibited movement.

In general, a first tubular member is rotatably journeyed to a second tubular member, forming a base member. The second tubular member has a top end and a bottom end, forming a longitudinal axis therebetween. The first tubular member rotator assembly includes a hand operated crank used for manual rotation of a driver gear located within a housing. The driver gear housing may be integrally formed or otherwise suitably coupled to the base member. The hand grip of the hand operated crank is positioned a fixed distance from the gear-train housing by a support post; the length of the support post can be made to accommodate the gear reduction ratio employed. Rotation of the hand operated crank operates the gear-train driver assembly to cause the rotation of the outrigger at the same time the outrigger is angled upwardly into a raised position. The outrigger assembly can be installed as original equipment or as a packaged kit for aftermarket installation.

An objective of the instant invention is to disclose the use of a positive control outrigger pole utilizing a gear-train drive system that provides an increase in torque, allowing rotation of the outrigger pole with minimal effort in both an X and Y plane.

Another objective of the instant invention is to teach the use of a gear-train drive positioning system that provides infinite adjustment of an outrigger between a stowage position and a raised and extended trolling position.

Yet another objective of the instant invention is to teach a multi-stage gear-train drive system that provides relatively slow rotation of an outrigger pole.

Still another objective of the instant invention is to teach the use of a single crank for operating a gear-train for rotation of an outrigger and/or angular placement of an outrigger.

Other objectives and advantages of this invention will become apparent from the following description taken in conjunction with the accompanying drawings wherein set forth, by way of illustration and example, certain embodiments of this invention. The drawings constitute a part of this specification, include exemplary embodiments of the present invention, and illustrate various objectives and features thereof.

BRIEF DESCRIPTION OF THE DRAWINGS

FIG. 4 is a front plane view thereof with covers removed;

FIG. 5 is a side plane view thereof with covers removed for rotation of the upper plane gear set;

FIG. 6 is a side plane view thereof with covers removed and engaged for rotation of the lower plane gear set;

FIG. 7 is a cross sectional side view thereof.

DETAILED DESCRIPTION OF THE PREFERRED EMBODIMENT

Figure 1:
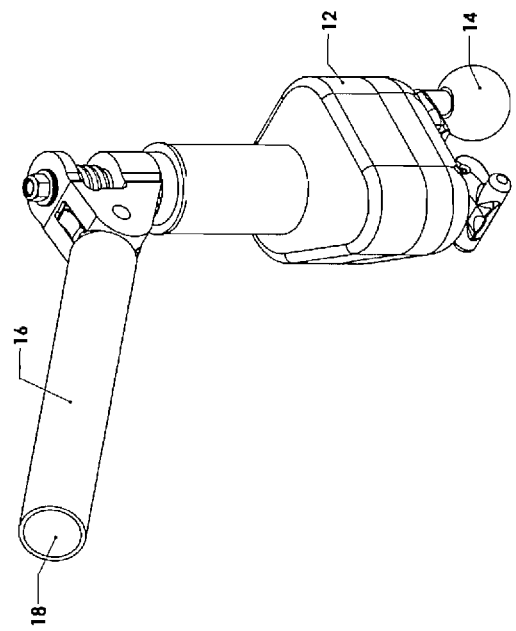
FIG. 1 is a perspective view of the gear driven outrigger positioner.
Figure 2:
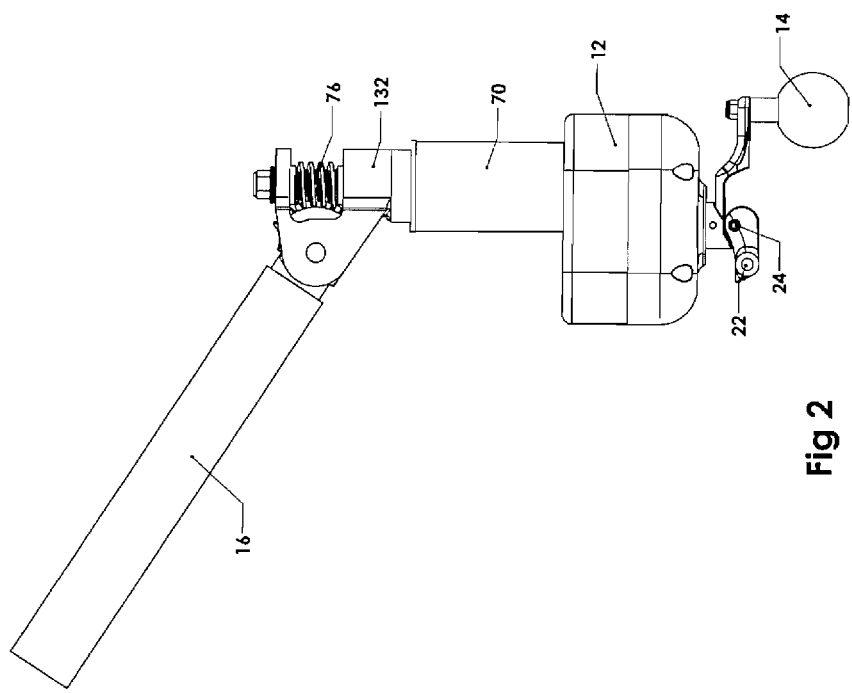
FIG. 2 is a plane side view thereof.

For ease of illustration, this specification is directed to the use of a manual rotatable crank, which is not limiting, but rather for purposes of illustration. The key advantage of the instant invention is the use of a gear-train reduction assembly that allows torque and rotational speed adjustment to impart the rotational action of the outrigger and, upon movement of a selector cam, allows angular positioning of the outrigger with a rotatable gear train assembly 15.

Referring to the Figures, illustrated is a gear-train driven outrigger device 10 for use on a fishing vessel 100 having a T-top 102 as an outrigger positioner. In particular, the outrigger positioner of the instant invention is directed for use with a fishing vessel having a T-top 102 defining an upper surface 104 and a lower surface 106. The T-top 102 provides sun protection to the occupants of the vessel 100 by placement over the helm 108 of the vessel 100. The outrigger device 10 is formed from a base member 12 containing the gear-train assembly 15. The gear-train assembly includes upper gear 36 operatively associated with first gear 38, second gear 50 and gear set 40. The upper gear 36 is held in position with a vertical bushing 48. The gear train assembly may include, but is not limited to, suitable combinations of: worm and worm gear, spur gears, helical gears, bevel gears, planetary gears, herringbone gears, ring and pinion gears, sprockets and chains, or belts and pulleys.

Figure 3:
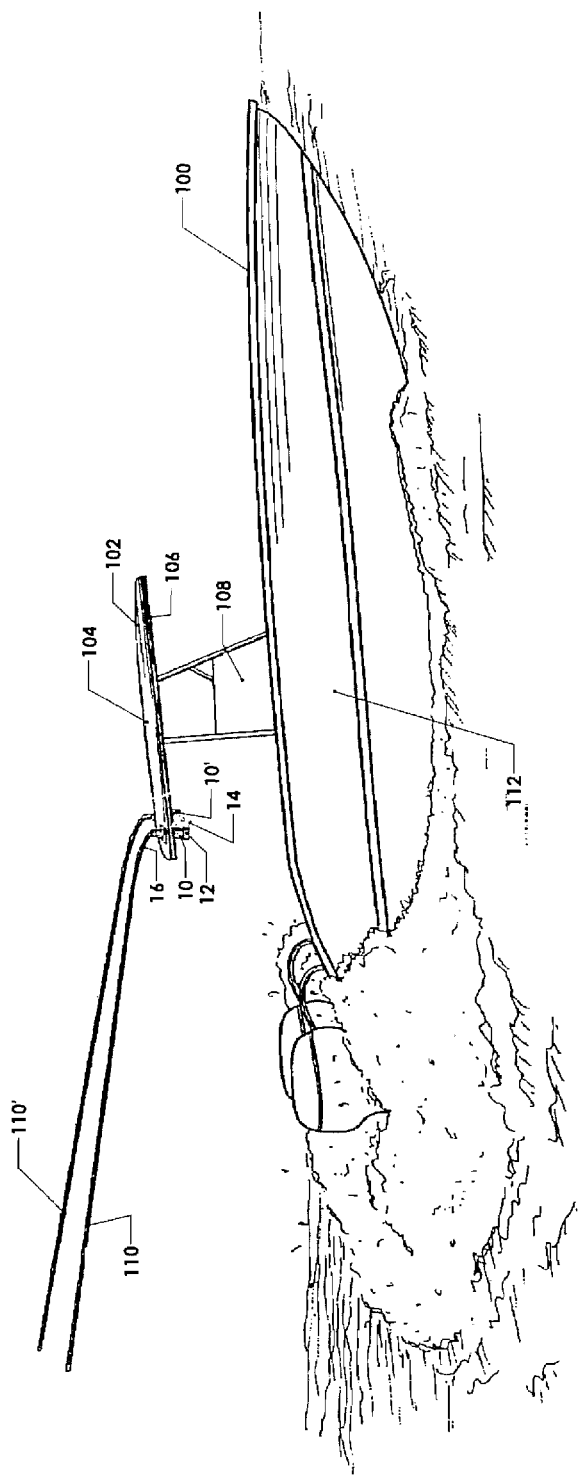
FIG. 3 is a pictorial view illustrating the outrigger positioner of the instant invention on a T-top vessel.
Figure 8:
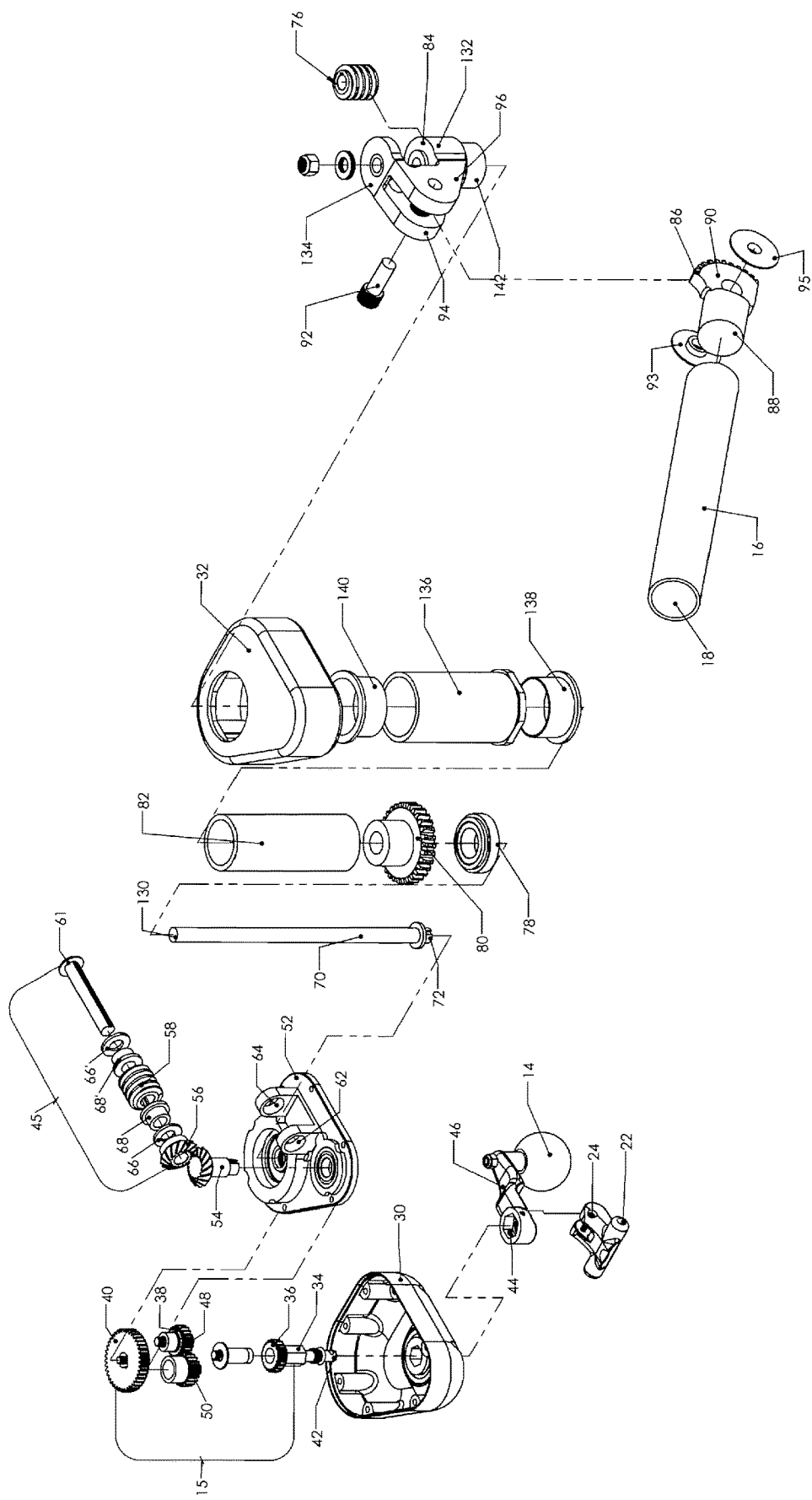
FIG. 8 is an exploded view.

The base member 12 is secured to the lower surface 106 of the T-top 102, wherein a crank handle 14 allows engagement of said gear assembly 15 and a first gear set 45. Operation of the crank handle 14 causes the horizontal rotation of a rigger adapter tube 16 in an X-plane. The rigger adapter tube 16 forms a receptacle 18 for securement of an outrigger pole 110. Rotation of the crank handle 14 moves the rigger adapter tube 16, secured to the outrigger pole 110, from a stowed position which aligns the outrigger pole 110 along the length of the vessel 100, to a deployed position extending outboard of the vessel. FIG. 3 depicts a vessel 100 with a port side 110 and starboard positioned outrigger pole 110' in the stowed position; a deployed position would be generally perpendicular to the length of the vessel 100 extending outwardly from the starboard side 112 of the vessel 100. Similarly, the port side mounted outrigger device 10', having an outrigger pole 110' is depicted in the stowed position; a deployed position would be generally perpendicular to the length of the vessel 100 extending outwardly from the port side of the vessel 100. The deployed position would further place the outrigger poles 110 and 110' at an acute angle relative to the surface of the water. The gear train assembly 15 is positioned within the base member 12 and coupled to a drive shaft 70 positioned within a rotation tube 82 and extending through the T-top 102 to a position above the upper surface 104.

The base member 12 includes a selector cam 22. The selector cam 22 is rotatable about a pinion 24, allowing selection by the gear train assembly 15 between the first gear set 45 or a second gear set comprising a drive gear 90 and a Y-plane second worm gear 76 coupled to the drive shaft 70. The crank handle 14 is used to rotate the drive shaft 70 for moving of the rigger adapter tube 16 in a Y-plane, wherein the outrigger tube could be angled in a vertical plane when the outrigger is placed outboard of the vessel.

The base member 12 includes a lower cover 30 securable to an upper cover 32. A selector cam drive gear 34 contained within an upper gear 36 for use in selection between an lower gear set 15 and the upper gear set 45; the selector cam drive gear 34 having a lower end 42 engaging a socket 44 offset by a bracket member 46 from the crank handle 14. The crank handle 14 is rotatable in either a clockwise or counterclockwise direction. The selector cam 22 rotates around the pinion axis 24 by coupling to the lower end 42 of the selector cam drive gear 34.

The upper plane gear set 38 has a drive gear 50 which is secured to a gear holder 52 and used for rotation of a first 90° bevel gear 54 and a second 90° rotational bevel gear 56. The second 90° bevel gear 56 is secured to a pinion held worm gear 58 supported by pinion 61. The pinion 61 further holds the worm gear 56 between supports 62 and 64 of the gear holder 52. Washers 66 and 66' and bushings 68 and 68', which can be formed of low maintenance Delrin and operate in combination with the worm gear supports 62 and 64 for frictionless and continuous engagement.

The drive shaft 70 has a lower end 72 that is securable to the lower plane gear set 40 and an upper end 130 securable to a Y-plane worm gear 76. A cone bearing 78 and rotational gear 80 are associated with the gear holder 52, wherein rotation of the crank handle 14 with the selector cam 22 in a first position causes rotation of the first bevel gear 54 and second bevel gear 56, thereby engaging the pinion held worm gear 58 to rotate the rotational gear 80, which is secured to a rotation tube 82. The rotation tube 82 is coupled to the rigger adapter tube 16 by use of a rigger base 84 having an up/down drive gear 86. The up/down drive gear 86 is formed integral with the support protrusion 88 which fits within the rigger adapter tube 16, the support protrusion 88 is secured to the rigger base 84 by use of a fastener 92, with Delrin bushings 93 and 95 allowing the up/down drive gear to rotate between bifurcated support protrusion members 94 and 96.

The Y-plane second worm gear 76 is secured to an upper portion 130 of the drive shaft 70, and fits between a base 132 and an upper bracket 134 of said rigger base 84. Rotation of the crank handle 14 with the selector cam 22 in a second position causes rotation of the drive shaft 70 and rotation of the Y-plane second worm gear 76. As the second worm gear 76 is rotated, the up/down worm gear 86 is rotated wherein the drive gear 90 pivots to cause a change in the angular position of the rigger adapter tube 16. The rigger base 84 is positioned above the upper surface 104 of the T-top 102. A spacer tube 136 maintains the distance between the support gear holder 52 and the rigger base 84; the spacer tube 136 having an upper bushing 140 to secure to the lower portion 142 of the rigger base 84. A lower bushing 138 secures to the support gear holder 52. The spacer tube 136 conceals the drive shaft 70 and rotation tube 82 from the elements.

The present invention preferably utilizes a worm and worm gear, which effectuate a transfer of rotational torque from a hand crank to cause a torque increased rotational movement of the outrigger pole. The use of single stage or multi-stage torque multiplying gear-trains allow controlled movement of oversized outriggers, even if the outrigger assembly has been poorly maintained, resulting in friction inhibited movement.

In the preferred embodiment, the gear-train assembly 15 includes a manually rotatable crank 14, wherein the operator utilizes a hand grip to rotate a drive gear. Manual operation of the rotational positioner can be complemented or replaced by a small electric or hydraulic motor. Electric motors and hydraulic motors generally run at relatively high speeds, significantly higher than those speeds required to effectively and accurately rotate an outrigger pole. Therefore, multiple stage gear-train reduction may be used within the gear train assembly 15 to accomplish the torque advantage and predetermined speed of rotation and angular positioning of the outrigger pole 110. The automatic drive mechanism is not illustrated, as the use of a drive motor is well known in the industry. Adaptation of a drive motor to the upper and lower gear assembly would be considered within the scope of this invention.

Mounting of the outrigger device 10 to the T-top 102 can be provided through a number of installations, all well known in the art. Common installations include welding or fastening the outrigger device 10 to a fixed structure, either in a parallel configuration or in-line. However, the preferred installation method is the use of the spacer tube 136 positioned through a hole formed in the T-top 102, whereby only a portion of the spacer tube 136 extends above the top surface 104 of T-top 102 with the base member 12 located beneath the bottom surface 106 of the T-top 102. Operation of the outrigger can be performed from beneath the T-top 102 to both rotate an outrigger in a horizontal X-plane and in a vertical Y-plane.

The outrigger assembly of the instant invention may be used for either a left hand or right hand mounting arrangement. The use of a gear-train allows for the transfer of power from the gear driver to the outrigger with a predicted ratio of velocities and torque transfer. It has been found that a ratio of about 30:1 accommodates most sport fishing situations, wherein a small hand crank can be used for rotation beneath the T-top. Multiple stage gear-trains may be used to achieve ratios of over 5000:1. The use of heavy outrigger poles may benefit from a higher torque ratio, which will require more drive gear rotation, but less rotational force. Reversing rotation of the crank assembly allows return of the outrigger into the original stowage position, again with minimal effort, despite rocking of the vessel or any other forces that may cause interference in normal rotation of an outrigger.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. An outrigger positioner for a fishing vessel comprising:
    a support housing securable to a T-top of a fishing vessel, said support housing having an upper portion housing a rotatable rigger adapter tube and a lower portion supporting a rotatable bracket member having a rotatable hand crank depending from a lower surface of said bracket member;
    a gear train assembly positioned between said rigger adapter tube and said rotatable hand crank, said gear train assembly including a cam drive gear slidably attached to one end of said bracket member and movable between a first position and a second position;
    a first gear set engaging said cam drive gear in the first position, said first gear set including a first worm gear positioned perpendicular to said cam drive gear, said first worm gear providing a torque transfer constructed and arranged to cause horizontal rotation of said rigger adapter tube upon rotation of said hand crank depending from said lower surface of said bracket member;
    a second gear set engaging said cam drive gear in the second position, said second gear set including a second worm gear positioned parallel to said cam drive gear, said second worm gear providing a torque transfer constructed and arranged to cause angular positioning of said rigger adapter tube upon rotation of said hand crank depending from said lower surface of said bracket member;
    a selector cam pivotedly coupled to said cam drive gear for selectively engaging said cam drive gear with said first gear set in a first position of said selector cam or said second gear set in a second position of said selector cam; and
    an outrigger secured to said rigger adapter tube;
    whereby rotation of said hand crank causes horizontal rotation of said outrigger between a horizontally disposed stowage position and a deployed position when said selector cam is in the first position and angular vertical movement of said outrigger between a stowage position and a deployed position when said selector cam is in the second position.

2. The outrigger positioner for a fishing vessel according to claim 1 wherein said first gear set provides an increase in torque at a ratio of about 30:1 between said rotatable hand crank and said rigger adapter tube.

3. The outrigger positioner for a fishing vessel according to claim 1 wherein said second gear set provides an increase in torque at a ratio of about 30:1 between said rotatable hand crank and said rigger adapter tube.

4. The outrigger positioner for a fishing vessel according to claim 1 wherein operation of said first gear set employs a first bevel gear rotated by said cam drive gear for engaging a second bevel gear coupled to said first worm gear wherein rotation of said first bevel gear allows for rotational movement of said rigger adapter tube.

5. The outrigger positioner for a fishing vessel according to claim 1 wherein said second gear set includes a drive gear mounted to a base of said rigger adapter tube, said drive gear engaging said second worm gear for angular displacement of said outrigger.

6. The outrigger positioner for a fishing vessel according to claim 1 wherein said gear train assembly is reversible allowing rotation of said first and second worm gear in a clockwise or counterclockwise direction.

7. The outrigger positioner for a fishing vessel according to claim 1 wherein said first and second gear sets in combination with said gear train assembly are constructed and arranged to allow movement of said outrigger only upon rotation of said hand crank, wherein external movement of said rigger adapter tube will not cause rotation of said hand crank.

8. The outrigger positioner for a fishing vessel according to claim 1 wherein said first worm gear is mounted on a pinion and secured to a support gear holder, said gear holder mounted in said support housing.

9. The outrigger positioner for a fishing vessel according to claim 8 including a cone bearing operatively associated with said support gear holder, said cone bearing maintaining rotational gear alignment of a rotational gear secured to a rotation tube coupled to said rigger adapter tube with said first worm gear.

10. The outrigger positioner for a fishing vessel according to claim 5 wherein said drive gear is rotatably coupled to a bifurcated support protrusion member, said bifurcated support protrusion member pivotedly securing said rigger adapter tube coupled to said drive gear.

\* \* \* \* \*